United States Patent [19]

Hero

[11] Patent Number: 4,547,990
[45] Date of Patent: Oct. 22, 1985

[54] FISHING APPLIANCE

[75] Inventor: Richard A. Hero, Mesa, Ariz.

[73] Assignee: D G & Associates, Inc., Scottsdale, Ariz.

[21] Appl. No.: 548,991

[22] Filed: Nov. 7, 1983

[51] Int. Cl.⁴ .................................. A01K 97/00
[52] U.S. Cl. ............................................... 43/15
[58] Field of Search .................................. 43/15

[56] References Cited

U.S. PATENT DOCUMENTS

| | | | |
|---|---|---|---|
| 2,712,194 | 7/1955 | Di Stefano | 43/15 |
| 2,918,745 | 12/1959 | Haynie | 43/15 |
| 4,011,679 | 3/1977 | Smith | 43/15 |
| 4,136,477 | 1/1979 | Hines | 43/15 |

Primary Examiner—Gene P. Crosby
Attorney, Agent, or Firm—Richard R. Mybeck

[57] ABSTRACT

A fishing appliance for use with a fishing pole and bait and interposed in the line connected therebetween. The appliance comprises a main stem having a stretchable spring secured at one end and a trigger arrangement attached at the other end for locking the spring in a stretched condition and releasing the spring in response to a force applied to said bait.

6 Claims, 6 Drawing Figures

FISHING APPLIANCE

BACKGROUND OF THE INVENTION

This invention relates generally to a fishing appliance and more particularly to a unique device for use in concert with conventional fishing gear to enhance the ability to effect a "catch" once a "strike" occurs.

To anyone who has ever engaged in the sport of fishing, there is no greater frustration than that which occurs when the "big one" nibbles the bait or mouths the plug only to spit it away when the angler attempts to set the hook and play the fish.

Various approaches have been tried to overcome the inevitable time lag which exists between the moment a fish bumps a fisherman's bait and the moment in which the fisherman's reactions allow him to pull on his line in an attempt to set his hook. One such approach involved the use of lighter, more flexible poles and the like, but without great success. Even today, the goal of the skilled fisherman, in addition to memorizing of all the special "holes" and the preferred baits, is to develop his eye-hand coordination to the degree whereby that inevitable time-lag between detecting the strike and setting the hook is minimized. However, even the most adept angler still suffers the remorse of the one that got away because even his/her quick draw is still not fast enough on all occasions.

SUMMARY OF INVENTION

The present invention is predicated upon the development of a new and unique fishing appliance which when operatively interposed between the line and the bait in a fishing set up, will respond to the present of a fish at the bait by disengaging a spring loaded trigger contained in the appliance to quickly retract the leader connected thereto to set the hook and thereafter, employing that spring, to play the fish and facilitate the catch.

Accordingly, one of the prime objects of the present invention is to develop a novel and unique fishing appliance which when interposed between the line and the leader in a fishing rig substantially eliminates dependency upon the subjective hand-eye coordination of the fisherman as a material factor in determining whether a strike can be successfully converted to a catch.

Another object of the present invention is to provide a novel and unique fishing appliance which in operation is capable of immediately responding the the touch of a fish at the hook to retract the leader and set the hook.

A further object of the present inventiion is to provide a novel and unique fishing appliance which includes resilent means for playing, hence tiring, a fish in whose mouth a hook has been set to facilitate the landing of the fish.

A still further object of the present invention is to provide a novel and unique fishing appliance which is inexpensive to make, easy to install, and simple to operate and which will in use substantially enhance the enjoyment of fishing for those heretofore cursed by an ineffective technique of converting strikes to catches.

These and still further objects as shall hereinafter appear are fulfilled by the present invention in a remarkably unexpected fashion as can be readily discerned from the following detailed description of an exemplary embodiment thereof, especially when read in conjunction with the accompanying drawing in which like parts bear like numerals through the several views.

THE DRAWINGS

DESCRIPTION OF PREFERRED EMBODIMENT

Figure 1:
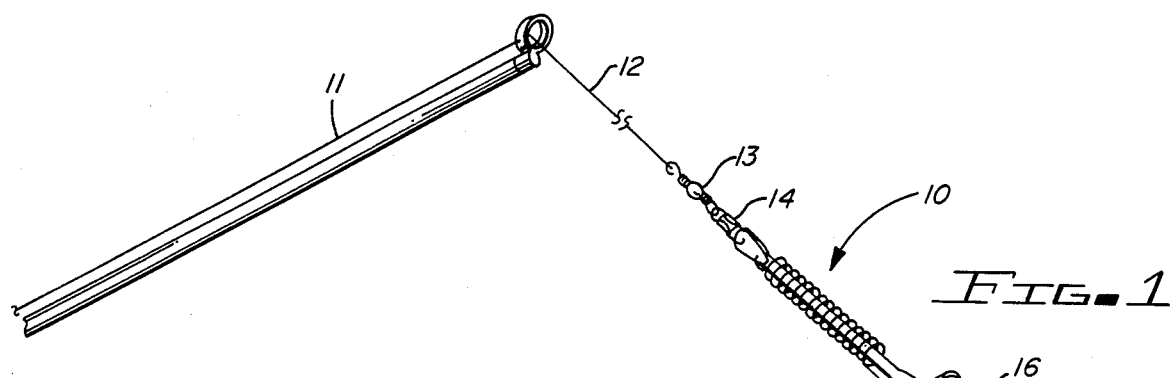
FIG. 1 is an isometric showing of a fishing rod in combination with an appliance embodying the present invention.

Referring to FIG. 1, an appliance 10 embodying the present invention is shown in combination with a fishing rod 11 which may range from a bamboo pole to a sophisticated casting rod but which, for ease of explanation will be herein referred to as "rod 11". Rod 11 is rigged with a line 12 extending therefrom having a conventional barrel swivel 13 and snap 14 secured thereto. Appliance 10 is attached to line 12 by snap 14.

A suitable bait which can be a fly, chub, jig, spinner, popper, worm rig, daredeveil or the like is illustrated simply as a barbed hook 15 secured to a leader 16 in the conventional manner. Leader 16 in turn is connected to the appliance 10 in a manner to be explained.

Figure 2:
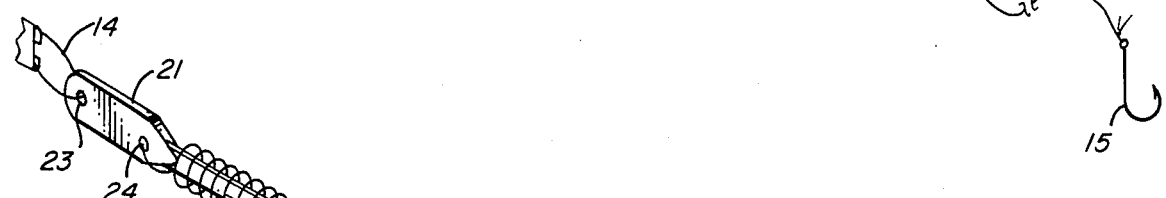
FIG. 2 is an isometric view of an appliance embodying the present invention.
Figure 3:
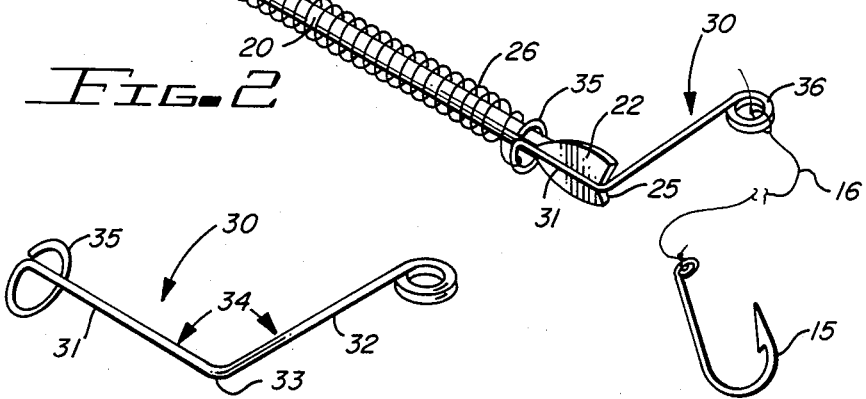
FIG. 3 is an isometric showing of the trigger mechanism of the device of FIG. 2.
Figure 4:
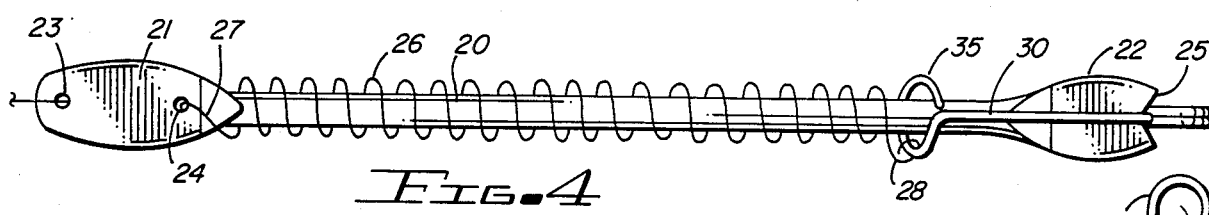
FIG. 4 is a upper elevation of the appliance of FIG. 2 in its cocked position.
Figure 5:
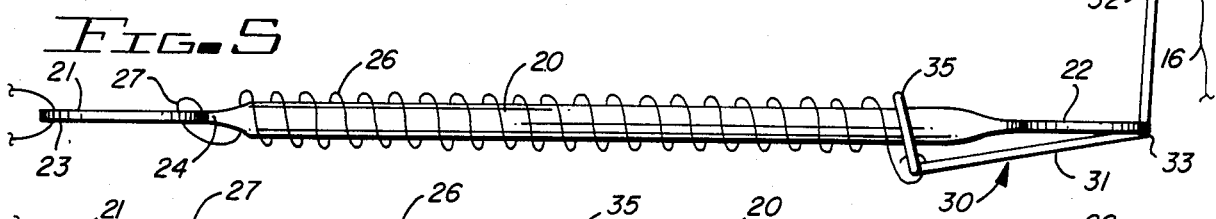
FIG. 5 is a side elevation of the appliance of FIG. 4.
Figure 6:
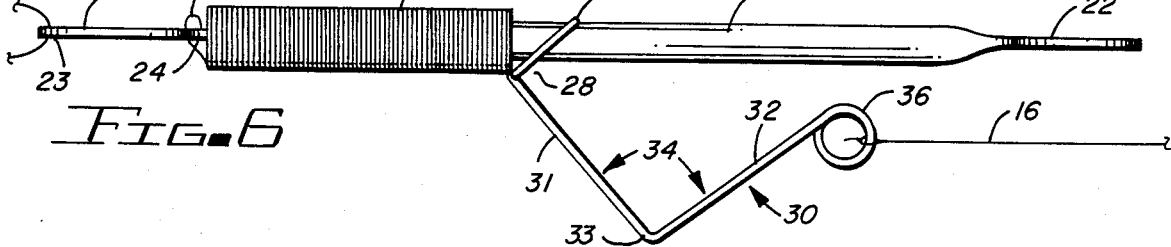
FIG. 6 is a side elevation of the appliance of FIG. 2 in its unloaded position.

Referring to FIGS. 2, 4 and 5, appliance 10 comprises a main stem 20 formed of a light weight material such as anodized aluminum, magnesium and the like, having a first flat portion 21 integrally formed therewith at one end thereof and a second flat portion 22 integrally formed therewith at the other end thereof. Portion 21 has a first opening 23 and a second opening 24 defined therethrough in spaced relationship to each other. Portion 22 has a "V shaped" notch 25 formed in the end thereof. Portions 21, 22 are preferably formed of stainless steel.

A compression spring 26 having a hook 27 at one end thereof is secured through opening 24 to anchor spring 26 in circumscription about stem 20. A second loop 28 is provided at the other end of spring 26 for a purpose to be now described.

Trigger member 30 comprises a shorter first arm portion 31 and a longer second arm portion 32 integrally formed and defining an elbow 33 therewith having an interior angle 34 of from about 100°–110° degrees in its preferred form but which, as will appear, can be adjusted to form angles of 90° to about 120° to meet the exigencies of the fish being sought. Each arm portion, for example arm portion 31, has a ring 35 formed at the end thereof which ring 35 circumscribes stem 20 for interlocking engagement with loop 28 of compression spring 26 while arm portion 32 has a ring 36 formed at the free end thereof to which leader 16 is secured by a suitable knot or the like.

Attachment 10 is secured to line 12 by passing snap fastener 14 through hole 23 in portion 21 and locking the fastener in its usual manner.

When in position as described, appliance 10 is loaded by pulling axially on trigger 30 until spring 26 is stretched sufficiently to allow elbow 33, and more particularly the inner angle 34 thereof, to be seated in the "V-shaped" notch 25 which holds the trigger member 30 and prevents spring 26 from involuntarily retracting.

When a fish engages bait 15, the force of the fish draws upon leader 16 causing elbow 33 to disengage from the "V shaped" notch 25 and causes spring 26 to instantly recoil (approximately 1½") which pulls suddenly and forcefully upon leader 16 and bait 15 to set the hook 15 in the fish, all without assistance or interferrence from the fisherman.

Once the hook 15 is set in the fish and during the process of "reeling it in", the appliance further functions to assist in playing the fish by the action of spring 26 in extending and recoiling in response to every tug thereupon.

Of course, it is understood that the appliance herein described and illustrated can be scaled up or down according to the size of the fish being sought and angle 34 can be adjusted to a wider or narrower value to accurately reflect the force of the fish being hunted.

It is further understood that such modifications, alterations and adaptations, as may readily occur to the artisan skilled in the field to which this invention pertains when confronted with this specification, are intended within the spirit of the present invention which is limited only by the scope of the claims appended hereto.

Accordingly what is claimed is:

1. A fishing appliance for operative interposition in a fish line extending between a fishing rod and a bait comprising; a main stem having a cylindrical body portion, said body portion having a first and second end portion disposed at each end thereof, said first end portion having a first and second opening defined therethrough, said first opening adapted to secure a fishing line to said main stem, said second opening adapted to secure a coil spring to said stem in circumscription thereabout, said second end portion having a notch formed therein adapted to receive and hold a trigger member therein when said spring is in its loading condition; means for securing said first opening in said main stem to a first portion of the fish line; said coil spring secured to said second opening in said main stem and extending along said main stem in circumscription thereabout; and said trigger member having a first arm portion and a second arm portion joined at an elbow to form an interior angle therebetween, said first arm portion being connected to the unsecured end of said coil spring, said second arm portion being connected to the second portion of the fish line, said trigger member coacting with said main stem to load said coil spring thereupon and retain said load until a force upon said second portion of said fish line disengages said trigger from said stem and permits said spring to recoil.

2. An appliance according to claim 1 in which said first arm portion has a ring portion at the free end thereof for engaging said coil spring while circumscribing said stem.

3. An appliance to claim 1 in which said interior angle is between 90° and 120°.

4. A fishing appliance adapted for operative interposition in a fish line extending between a fishing rod and a bait comprising: a main stem portion having a first end portion and a second end portion; a coil spring secured at one end thereof to said first end portion of said main stem and extending therefrom in circumscription about said main stem to an unsecured end; a trigger member having a first arm portion and a second arm portion, said first arm portion being deposed relative to said second arm portion to define an interior angle therebetween, a first ring member formed on said first arm portion at the free end thereof disposed in circumscribing relationship about said stem in locking engagment with said unsecured end of said coil spring, and a second ring member formed on said second arm portion at the free end thereof and adapted to receive and secure a leader and bait therewith, said second end portion of said main stem having a "V shaped" notch defined therein for receiving and securing said trigger member when said coil spring is in a stretched condition.

5. An appliance according to claim 4 in which said first arm portion is relatively shorter than said second arm portion and define an interior angle of 90° to 120° therebetween.

6. An appliance according to claim 5 in which said interior angle is between 100° and 110°.

* * * * *